United States Patent [19]

Beningson et al.

[11] 4,063,903
[45] Dec. 20, 1977

[54] APPARATUS FOR DISPOSAL OF SOLID WASTES AND RECOVERY OF FUEL PRODUCT THEREFROM

[75] Inventors: Robert M. Beningson; Herbert E. Beningson, both of Stamford, Conn.; Narayanankutty V. P. Menon, Jamaica, N.Y.; Ravindra M. Nadkarni, Arlington; Thomas J. Lamb, Lexington; Lee K. Fox, Waltham; William V. Keary, Wayland, all of Mass.

[73] Assignee: Combustion Equipment Associates Inc., New York, N.Y.

[21] Appl. No.: 611,368

[22] Filed: Sept. 8, 1975

[51] Int. Cl.² .................. C10L 5/22; B30B 11/00; E06B 9/04
[52] U.S. Cl. ............................................ 44/2; 44/1 D; 110/18 R; 110/28 A
[58] Field of Search ............................ 44/2, 10, 11–13; 110/18 R, 28 A

[56] References Cited

U.S. PATENT DOCUMENTS

| 3,304,991 | 2/1967 | Greenfield | 44/1 R |
| 3,506,414 | 4/1970 | Skendrovic | 44/1 R |
| 3,830,636 | 8/1974 | Marsh | 44/1 D |
| 3,910,775 | 10/1975 | Jackman | 44/13 |

Primary Examiner—Carl F. Dees
Attorney, Agent, or Firm—Blum, Moscovitz, Friedman & Kaplan

[57] ABSTRACT

Apparatus for the disposal of solid wastes by converting the organic fraction of such wastes to a fuel or fuel supplement and by recovering one or more of the constituents of the inorganic fashion. A minimum amount of sterile land fill remains. No significant pollution problems are created. The apparatus comprises shredding means, primary separating means, magnetic separating means, fines separating means, acid applying means, drying/heating means, grinding means and means to separate the fine product fuel. The system can, if desired, be essentially self-contained in heat energy requirements.

51 Claims, 16 Drawing Figures

APPARATUS FOR DISPOSAL OF SOLID WASTES AND RECOVERY OF FUEL PRODUCT THEREFROM

BACKGROUND OF THE INVENTION

This invention relates to a system and apparatus for the disposal of solid waste materials and for the conversion of the combustible organic fraction of such solid waste materials to a useable fuel material. Recovery of a major portion of the inorganic fraction may also be accomplished.

The disposal of solid wastes has become an increasingly severe problem in view of the increasing population, the concentration of populations in urban and suburban areas and in the increasing number of industries generating solid wastes. A large fraction of such waste may be of organic origin which is of a combustible nature. This organic fraction is normally made up of such materials as paper, textiles, leather, rubber, yard wastes, wood, wood wastes and bark, garbage and some forms of plastics. However, such an organic fraction requires processing to make it suitable as a fuel. In addition, solid wastes generally contain an inorganic fraction which may comprise ferrous and nonferrous metals as well as glass, dirt, and other forms of plastics. The apparatus of this invention is directed to the disposal of solid wastes and to the recovery of the organic fraction of solid waste in the form of a finely divided product which can be used as a fuel or fuel supplement. Optionally, this apparatus may also include means to recover the various components making up the inorganic fraction in the form of one or more valuable products.

Inasmuch as it is becoming increasingly difficult to dispose of solid wastes by such previously used means as dumping and filling, a critical need has arisen to find other techniques for solid waste disposal, such techniques of necessity being those which do not create pollution problems and of preference those which do not require the expenditure of appreciable amounts of energy. Moreover, if the end product or products of the disposal process are themselves usable, the process is even more desirable.

In general, the techniques more recently proposed for solid waste disposal may be classed as those which provide apparatus for bulk reduction, conversion or reclamation. Although some advances in bulk reduction (densification) have been made, each of the techniques used (baling, incineration, etc.) have inherent drawbacks including disposal of the densified material, pollution control, and the like. Conversion is generally defined as the chemical or biochemical transformation of the waste material into a useful product; and the techniques used include pyrolysis (destructive distillation or decomposition at elevated temperatures, e.g., 750°–1600° F in the absence of air or other reactive or oxidizing gases), partial oxidation, composting (aerobic conversion of cellulose waste into inert humus-like material by aerobic bacteria), hydrogenation, wet oxidation, hydrolysis, anaerobic digestion, biological fractionation and the like.

Reclamation involves the separating out by handsorting materials such as glass, plastics, metals, papers, textiles and the like for reuse in one form or another. However, other than some forms of paper (corrugated and newsprint), some plastics and textiles, the combustible component of organic solid wastes has not been recovered. Only recently has any serious attempt been made to convert these combustible materials to a form in which they could be used as a fuel.

In copending applications Ser. Nos. 456,338 now U.S. Pat. No. 3,961,913 and 557,433 now U.S. Pat. No. 4,008,053 filed in the names of Richard S. Brenneman and John J. Clancy for "Process for Treating Organic Wastes and Product Thereof," and assigned to the same assignee as this application, there is described and claimed in a process which makes it possible to treat the combustible organic fraction of solid wastes to form a finely divided, relatively dense fuel or fuel supplement using a relatively small amount of energy. The resulting product is a finely divided material usable as a fuel or fuel supplement in existing combustion equipment without requiring any substantial modification. This product retains essentially all of the dry weight and caloric content of the original solid organic waste material from which it is formed.

In the process described in these copending applications, the combustible organic fraction of solid waste is treated with one or more mineral acids and heated to an elevated temperature under conditions to form an embrittled material, readily reducible to a finely divided form, without effecting any substantial pyrolysis, decomposition or loss in dry weight of the organic waste. The process may also include the steps of separating organic and inorganic fractions, primary gross size reduction and predrying before embrittlement and grinding, separating the fuel product from inorganics, pelletizing and mixing with other fuels subsequent to embrittlement. The apparatus of this invention is particularly suited for carrying out such a process.

It is therefore a primary object of this invention to provide apparatus, along with a system incorporating such apparatus, for disposing of solid waste materials containing both organic and inorganic fractions. It is another object of this invention to provide apparatus for waste disposal of the character described which includes the treating of the combustible organic fraction of the solid waste to embrittle it and form it into a fuel or fuel supplement. It is a further object of the invention to provide such apparatus which requires the expenditure of relatively little energy, which makes it possible to achieve a net energy efficiency (fraction of total contained energy in waste recovered) of as much as 0.75, and which provides the capability of being formed into a system which may be substantially self-contained as far as heat energy requirements are concerned.

A further object of this invention is to provide apparatus to convert the organic fraction of solid waste to a useable product having a bulk density which is greater than and handling characteristics which are materially improved over the original form of organic material in the wastes treated.

Still another object of this invention is the providing of apparatus for the disposal of solid wastes which results in the elimination or minimization of the need for land fill and which produces only sterile by-products in the form of gas and any solids residue which may result. A further object is to provide such apparatus which does not create any pollution control problems.

It is a yet further object of this invention to provide apparatus for separating the components of solid wastes in a manner to provide a combustible organic fuel or fuel supplement along with reuseable ferrous and nonferrous metals and glass.

It is yet another primary object of this invention to provide apparatus for forming a unique fuel or fuel supplement formed from a combustible fraction of solid wastes. It is a further object to provide a fuel of the character described which retains essentially all of the dry weight and caloric value, in a greatly densified form, of the organic material from which it was formed.

An additional primary object of this invention is to provide apparatus which may be integrated into a total system of solid waste disposal and which is sufficiently flexible to be readily suitable for handling solid municipal waste.

Other objects of the invention will in part be obvious and will in part be apparent hereinafter.

SUMMARY OF THE INVENTION

In brief, the apparatus of this invention for disposing of solid waste and for converting the organic content thereof into a combustible fuel or fuel supplement comprises, in combination, shredding means to reduce solid wastes containing inorganic and organic fractions to a particulate initial feed material, primary separating means to return insufficiently shredded material for further shredding, magnetic separating means to isolate the ferrous materials, fines separating means to remove the fines including glass, dirt, sand and the like, acid applying means, drying means, heating means to heat the organic fraction either directly or indirectly, grinding means to grind the resulting organic fuel product material embrittled through treatment with heat and acid, and grinder discharge separating means. In preferred embodiments of this invention the heating means comprise means to heat grinding media, e.g., steel balls which are used in the drying and grinding means and the fuel used is primarily in the form of waste fractions derived from the process being performed in the apparatus.

In addition, the apparatus of this invention may include means to recover at least a portion of the inorganic fraction in one or more usable forms, e.g., ferrous and nonferrous metals and glass.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the following drawings in which FIG. 1 illustrates one preferred embodiment of the apparatus of this invention in somewhat schematic form;

In the following detailed description of this invention, the term "organic fraction of solid wastes" will be used to designate generally the materials used to form a fuel or fuel supplement. This term encompasses all materials which are of organic origin and which, when they undergo combustion in the presence of oxygen, produce caloric energy. The term therefore, includes, but is not limited to, papers, paperboards, textiles, wood, wood wastes including barks, agricultural wastes including bagasse and the like, food wastes, yard wastes, rubber and some forms of plastics.

It will be seen from Table 1 that such materials make up the greater part of so-called solid municipal wastes which may be taken as exemplary of the type of solid wastes for disposal in the apparatus of this invention.

Table 1

| | Composition of a Typical Solid Municipal Waste | |
|---|---|---|
| | % by Weight, Dry Basis | |
| Component | Total Waste | Combustible Organic Fraction |
| Paper & Paperboard | 40.0 | 52.9 |
| Yard Wastes | 12.0 | 15.5 |
| Food Wastes | 9.3 | 12.1 |
| Wood | 8.4 | 10.9 |
| Textiles | 2.5 | 3.2 |
| Plastics | 2.5 | 3.2 |
| Rubber | 1.1 | 1.4 |
| Leather | 0.6 | 0.8 |
| Glass | 10.3 | |
| Metal | 7.1 | |
| Dirt | 5.3 | |

Such solid wastes typically have a moisture content of from about 15% to 30%, almost all of which is associated with the organic fraction.

DESCRIPTION OF PREFERRED EMBODIMENTS

Figure 1:
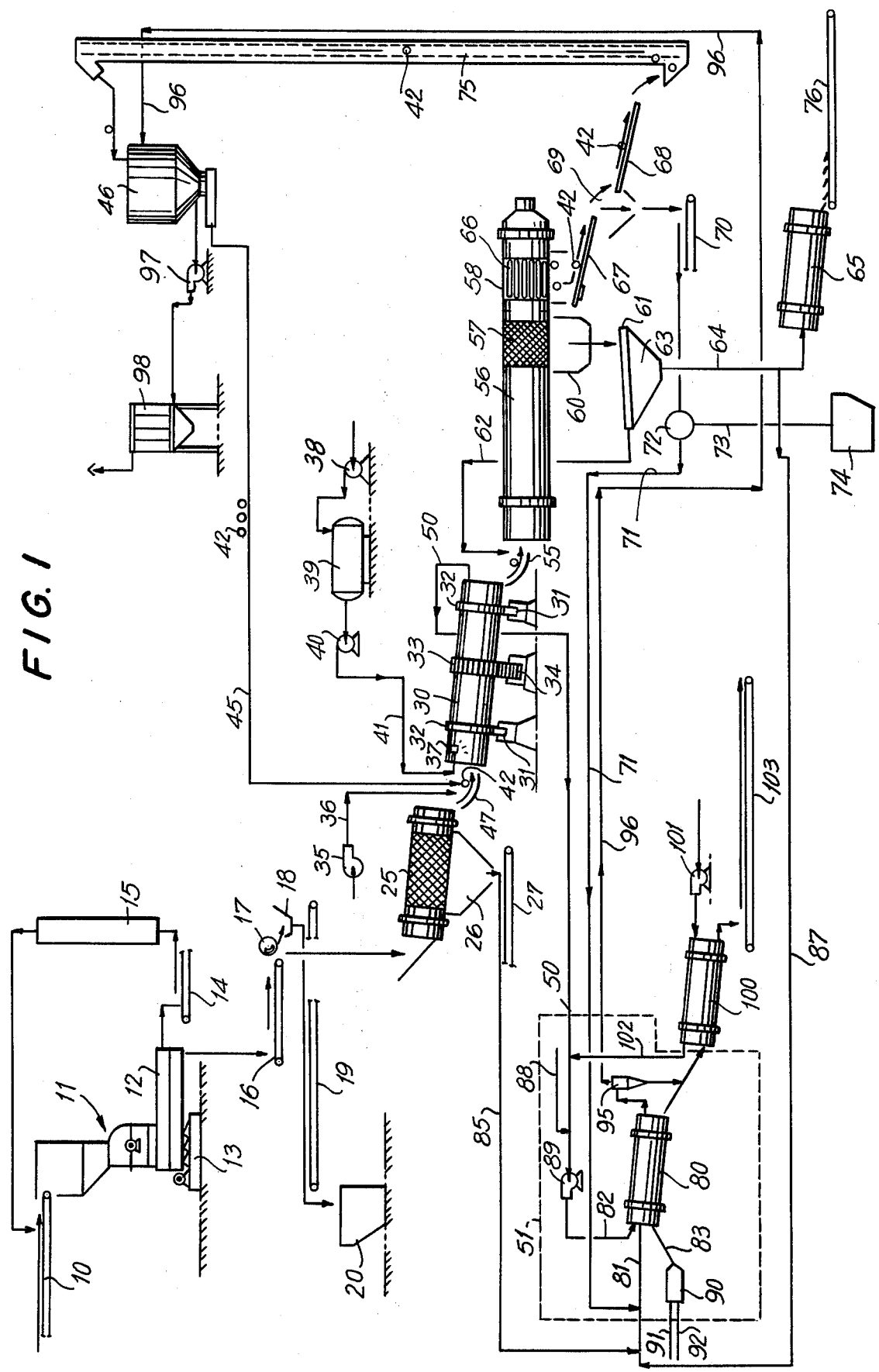

FIG. 1 illustrates, in somewhat schematic fashion, one embodiment of the apparatus of this invention. In the apparatus of FIG. 1, the solid waste to be disposed of is delivered to a conveyor belt 10 which takes it to shredding means 11, which may be either a high-energy device such as a hammermill or a lower-energy device such as a flail mill. Alternatively, the shredding means may be a tumbling device such as a ball, rod or cascade mill. Preferably, shredding is carried out to the extent that a major portion of the solid waste is reduced to relatively small-sized material, preferably no greater than about four to eight inches in any one dimension and most of the glass contained therein is pulverized. The bulk of the material which results from shredding will hereinafter be referred to as "shredded feed material." It will, of course, be appreciated that the optimum average size for this shredded feed material may depend upon the quality of the solid waste being processed, the particular types of apparatus components employed and the conditions (temperature, time and acid) used subsequently to embrittle the organic fraction of the solid waste. FIG. 1 illustrates the use of a flail mill as the shredding means; and it has associated with it a first or primary size separating means illustrated in FIG. 1 as a vibrating screen 12, along with means 13 to vibrate it, designed to separate out that material not reduced to the desired size for the shredded feed material. Such oversized material is delivered to conveyor belt 14 for return by any suitable conveying means 15 (e.g., a belt conveyor) back to shredder 11 for reshredding.

This primary size separating means may, of course, comprise any other apparatus component suitable for isolating the shredded feed material within the desired size range. Exemplary of another primary size separating means is an air-classifier illustrated in FIG. 2 and described below.

In the following detailed description of the apparatus of this invention it will be convenient to complete the description of an overall apparatus system as shown in FIG. 1, making reference to modifications and apparatus component embodiments further illustrated and described in succeeding drawings.

Figure 3:
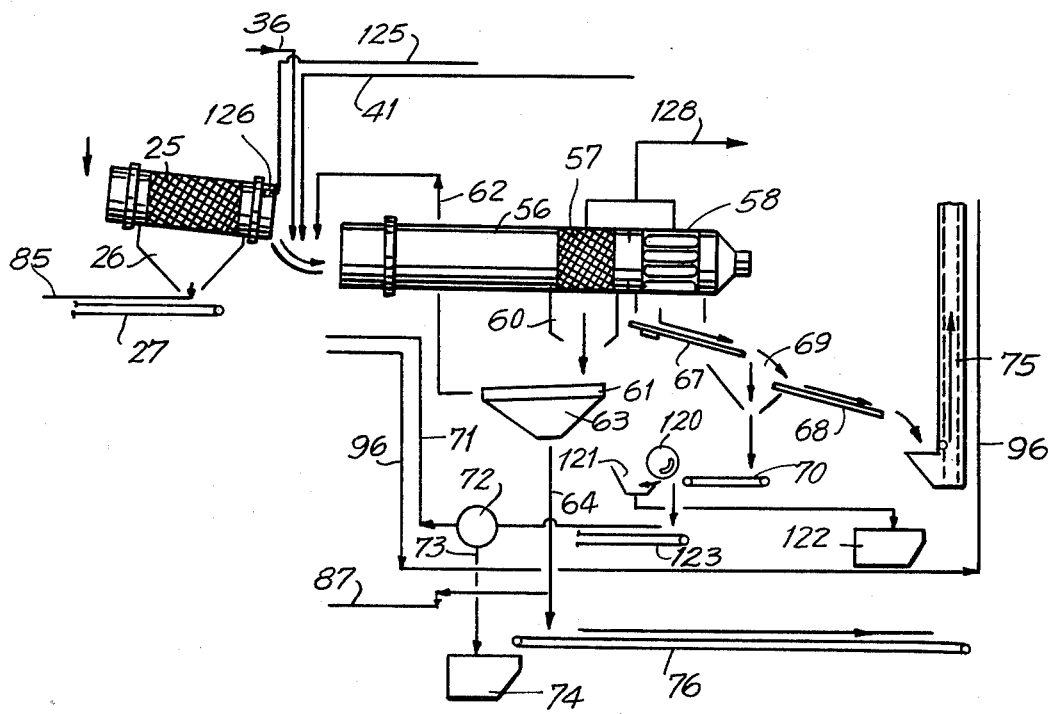
FIG. 3 illustrates one modification in the locations of the acid applying means and of the magnetic separator means and the combination of the drying and grinding means into one apparatus component.

That portion of the shredded feed material which passes the vibrating screen 12, or which has been otherwise isolated, i.e., has been reduced to the desired size for the shredded feed material, is dropped onto conveyor belt 16, at the delivery end of which is located a magnetic separator 17 arranged to remove substantially all of the ferrous and any other magnetic material from the feed material. This magnetic separating means may typically be a magnetic cross belt, a magnetic drum, and/or a magnetic pulley. What may for convenience be designated the "ferrous fraction" is then collected in collector bin 18 from which it may be conveyed such as by belt 19 to a ferrous metal storage bin 20. The magnetic separating means may, alternatively, be so positioned as to separate out the ferrous fraction after grinding, as illustrated in FIG. 3 and discussed below. A preferable arrangement is to incorporate magnetic separating means in both of these positions, i.e., after the primary size separating means and after the grinding means.

The shredded feed material, essentially free of the ferrous fraction, is then transferred to a fines separating means or fines screening means, shown in FIG. 1 as a rotary screen 25. Alternatively, this fines separating means may be a vibrating screen or any other separating means capable of separating fine glass, dirt, sand, high-ash residues and other relatively finely divided noncombustibles. As will be described below, these fines, separated out by the fines separating means, are preferably used as a portion of the fuel required to provide heat energy to the system; and they are directed through chute 26 to a conveyor 27 to be taken to a heat generation means described below. These fines, by themselves, are essentially noncombustible, but they do contain combustible components which in combination with other recycled fractions will burn. The result is efficient utilization of the energy potential in the solid waste and the sterilization of the discarded or reclaimed inorganic fractions.

The shredded feed material discharged from the fines separating means is then introduced into the inlet end of a dryer which also accomplishes some of the necessary heating. The drying means, shown in FIG. 1 as a rotary kiln 30 should be capable of reducing the moisture content of the shredded feed material to about 10% or lower. When the drying/heating means is separate from the grinding means, as in the embodiment of FIG. 1, then it is possible to use a rotary kiln (or similar rotary equipment) rotating at as low as ten percent of its critical speed, which is inversely proportional to the square root of its diameter. Generally, this results in rotating speeds of the order of from about 2 to 5 rpm. Rotation of the dryer 30, as well as of any other rotary equipment such as rotary screen 25 and rotary grinders, is accomplished by any well-known means such as, for example, that shown for rotary kiln dryer 30. Such means include paired rollers 31 arranged to engage two or more tires 32 affixed to the exterior of the rotary drum as supports and at least one driven gear 33 mounted around the drum for engagement with a driving gear 34 rotating on a shaft driven by a motor (not shown) as the rotating means.

In the apparatus embodiment of FIG. 1 the acid used for embrittlement is introduced through acid applying means positioned at the inlet end of the dryer along with air and heated grinding media serving initially to transmit heat to and remove moisture from the shredded feed material.

These grinding media are formed of a material which possesses the ability to reduce the embrittled organic fraction to the desired particle size and the heat capacity necessary to transmit heat for drying. Steel balls of a diameter ranging between about ¾ inch and four inches represent a preferred form of such grinding media. In the drawings and detailed description which follows, the grinding media will, for convenience, be referred to as steel balls. It is, however, to be understood that other suitable grinding media such as ceramic balls may be employed.

Air, for carrying off the steam generated in drying, is delivered by fan 35 through air feed line 36; and the acid component (e.g., HCl or $H_2SO_4$ or a mixture of both as an aqueous solution) is conveniently introduced through one or more spray nozzles 37 positioned within the dryer. This acid component may be first pumped by pump 38 into a storage tank 39 from where it is metered and pumped by metering pump 40 to the spray nozzles through acid feed line 41. The hot steel balls 42, heated to about 400° F, are conveyed by gravity, indicated by line 45, (or by any other suitable conveyance means) from a ball heater 46, described below. The steel balls are conveniently dropped onto a curved chute 47 which directs them into rotary dryer 30. The steam which results from the drying of the shredded feed material through contact with the hot steel balls is carried out of the discharge end of dryer 30 through a suitable fluid line 50 to be used in the heat generation means 51 described below.

Figure 4:
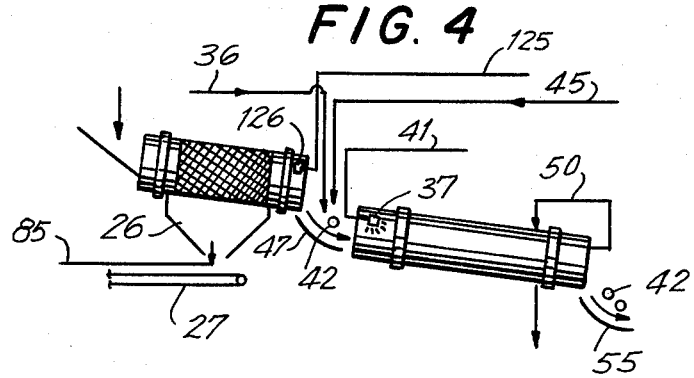
FIG. 4 illustrates another modification in the location of the acid applying means.
Figure 5:
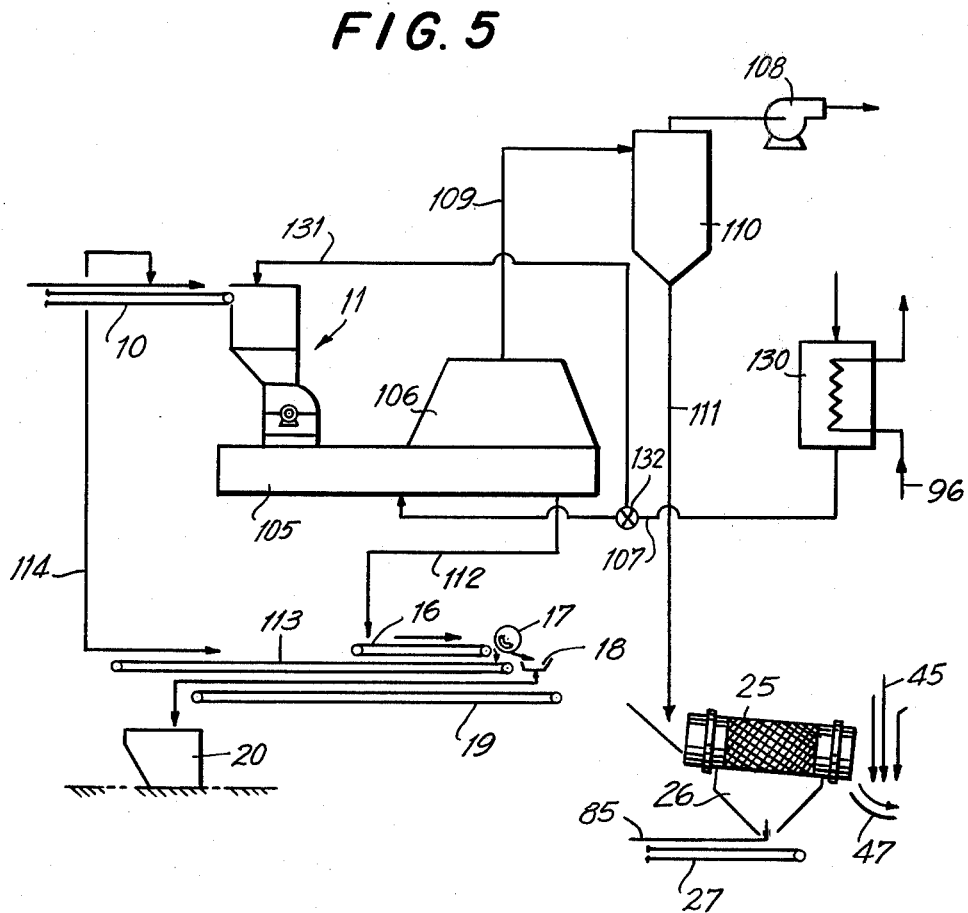
FIG. 5 illustrates the use of hot gases directly to accomplish part or all of the drying in an air-classifier used as the primary separating means.
Figure 6:
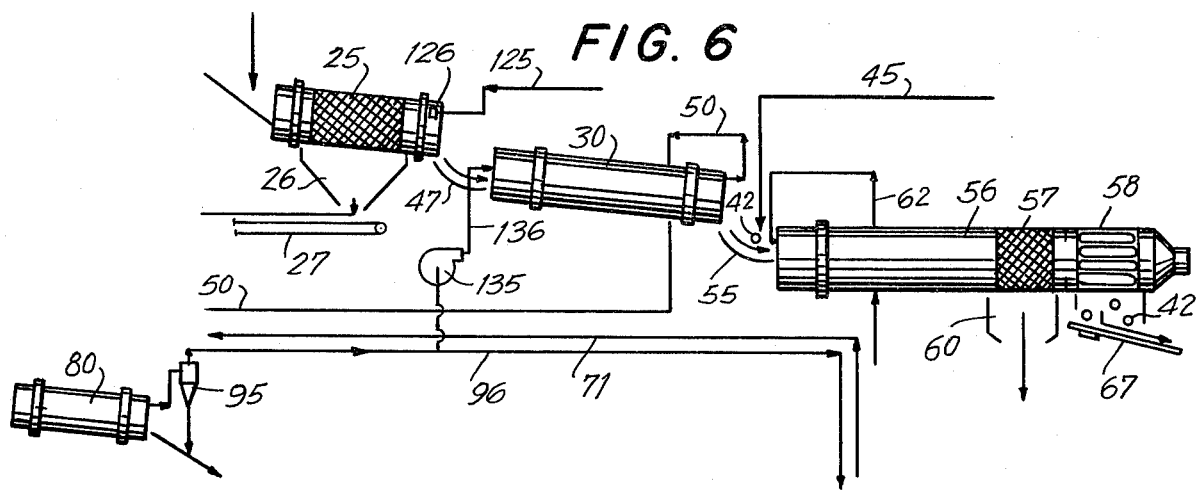
FIG. 6 illustrates the use of a portion of the hot gases developed to accomplish drying directly and the remainder of the hot gases to heat grinding media.
Figure 7:
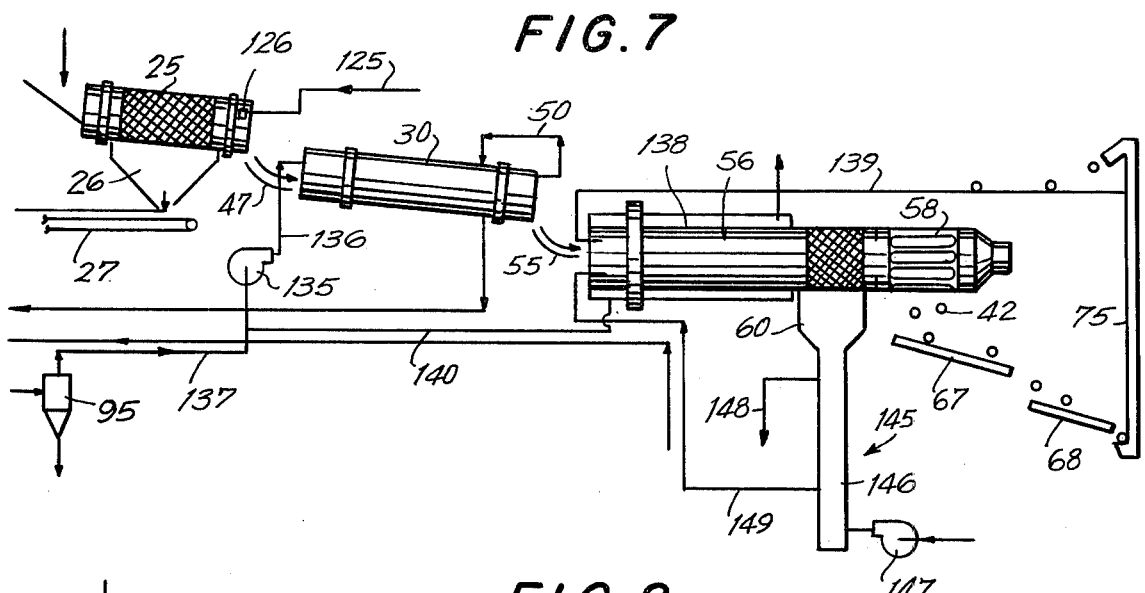
FIG. 7 illustrates the use the hot gases developed to provide heat directly to the drying and grinding means, the circulation of unheated grinding media, and a modification in the grinder discharge separating means.
Figure 8:
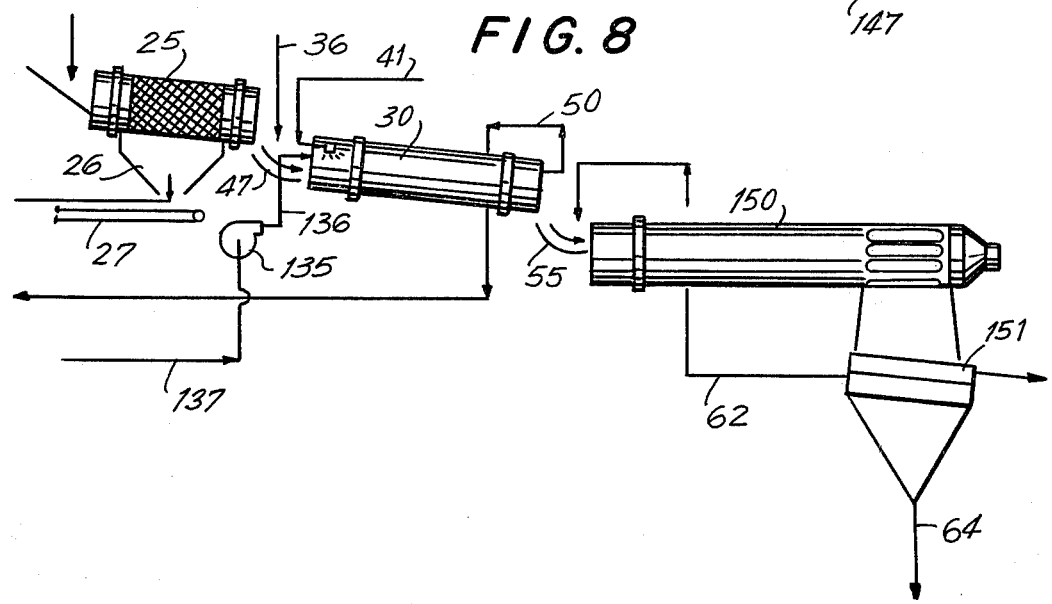
FIG. 8 illustrates the use of a rod mill for grinding.

As will be illustrated below in FIGS. 3 and 4, it is also possible to position the acid applying means in the discharge end of the fines separating means in place of or in addition to the locating it within the inlet end of the drying means. Moreover as shown in FIGS. 5-7, heat for drying the shredded organic organic feed material may be provided in whole or in part in the form of hot gases in which case the heated steel balls may be used at a lower temperature in the dryer or recirculated after separation from unembrittled material without heatng. Alternatively, as shown in FIG. 8, a rod mill may be substituted for the ball mill.

The shredded feed material as it leaves dryer 30 can have some moisture and it contains the acid component used for embrittlement of the cellulosic content of this material. In the apparatus embodiment of FIG. 1 the residence time, degree of agitation and attritive processing of this acid treated, dried, hot shredded material in the dryer will not be sufficiently long to both complete the embrittlement step and accomplish grinding to the desired finely divided particulate fuel product. Therefore, a separate grinding means is provided in the embodiment of FIG. 1. Such grinding means should be capable of preferentially reducing the particle size of a substantial portion of the organic fraction to between about minus 20-mesh and minus 200-mesh while not achieving any significant pulverization of the non-combustibles which may include such components as nonferous metals (e.g., aluminum) plastics and any residual ferrous metal components if magnetic separation was omitted or if it failed to achieve complete separation of the ferrous metals prior to embrittlement.

One preferred grinding means comprises a modified ball mill used with hot steel balls discharged from the dryer means. As shown in FIG. 1, the dried, acid-treated, shredded feed material, which may be partially ground, along with the steel balls are tumbled out of the discharge end of rotary kiln dryer 30 and taken by chute 55 into the inlet end of a modified ball mill 56. The steel balls are typically at about 250° F when they enter grinder 56. Generally, the modified ball mill 56 serving as the grinding means may be rotated at between about 50 and 70% of its critical speed. When drying and grinding are carried out in two separate apparatus components it is possible to rotate the dryer component at a slower speed than the grinder component which in turn results in the saving of energy. Grinding of the final product may also be done in a rod mill as illustrated in FIG. 8. As will be shown below in connection with FIG. 3, it is within the scope of this invention to combine the drying and grinding functions into a single apparatus component.

Since grinding is preferably accomplished through attrition using either grinding media such as steel balls, or unembrittled shredded inorganics, or a combination of both, it is necessary to provide means to separate the ground organic component from the unembrittled material and the steel balls. In the embodiment of FIG. 1 these grinder discharge separating means comprise a portion of the grinder and additional means external of the grinder. Other embodiments and modifications of these grinder discharge separating means are detailed in FIGS. 9-15.

In the apparatus embodiment of FIG. 1, rotary grinder 56 is modified to provide a rotating screen section 57 and a rotating ball discharge section 58 between the rotating screen section 57 and the end of the rotary grinder. Grinding of the embrittled organic fraction is accomplished between inlet end of grinder 56 and screen section 57. The resulting finely divided organic fuel product, along with any insufficiently ground organic product material discharged through rotary screen section 57, is directed through chute 60 onto embrittled organic screening means shown as screen 61. Typically, such a screen is sized (e.g., about 20-mesh) to pass the final dry organic fuel product material and retain the insufficiently ground material which is then carried by any suitable means along transport line 62 back through the grinder. The final fuel product, in the form of finely divided dry material, is drawn off from the screen collector 63 and delivered through product line 64 to a product cooling means 65 and thence to conveyance means 76 to be taken to storage or to a further processor such as a briquetting means. Product cooling means 65 may be, for example, a rotary cooler such as shown in FIG. 1, or any other suitable heat transfer device including a pneumatic conveyor designed to effect the direct cooling of the finely divided material. Separate cooling means may be eliminated if the cooling function is inherent in the grinder discharge separating means as in the apparatus of FIGS. 7, 10 and 11.

The ball discharge section 58 of the rotary grinder 56 is preferably formed to have a plurality of lengthwise slots 66 (or circular holes) cut through the wall of the grinder and of a width sufficient to permit the steel ball and any unembrittled material to pass therethrough and to be guided onto a first receptor tray 67 which is positioned and spaced from a second receptor tray 68. In addition to the steel balls, any unembrittled and unground nonorganic material is discharged through slots 66. Because this byproduct material is nonspherical, it does not pick up a velocity due to rolling and it falls into spacing 69, defined between the first and second receptor trays 67 and 68, or along the side of tray 67 and onto conveyor 70 from where it is taken by suitable means, represented by line 71, to the heat generating means 51. The steel balls jump and gap between trays 67n and 68. As will be illustrated in FIGS. 12 and 13, it may be desirable to remove at least some of the unembrittled byproduct material along the side of tray 67 to prevent undue lessening of the momentum of balls 42.

The cooled steel grinding balls are delivered to a conveyor mechanism, shown as a bucket elevator 75, which carries them to ball heater 46 from which they are recycled after reheating to the desired temperature for use in the drying and grinding of the shredded feed.

The apparatus embodiment of this invention illustrated in FIG. 1 is designed to be substantially self-contained with respect to supplying sufficient heat energy to heat the steel balls, i.e., to achieve drying, heating and grinding. This heat energy is derived from several sources through the burning of a combination of the fines discharged from the fines separating means, e.g., rotary screen 25 and of the unembrittled material discharged from the grinder 56, along with any of the final fuel product as needed. This is accomplished in what, for convenience, is termed generally the heat generating means 51. This burning is accomplished in any combustion device suitable for burning these by-products at a temperature preferably below that at which any appreciable fusion of the inorganics, particularly glass, takes place. However, it is also within the scope of this invention to burn these by-products at a temperature high enough to fuse the inorganic materials, thereby producing an inert slag. Exemplary of such a burner/sterilizer means is the rotary kiln 80 having a combustibles inlet line 81, and air inlet line 82 and a combustion gases inlet line 83. A shaft kiln is equally suited for this purpose. Communicating with combustibles inlet line 81 are line 85 carrying fines from conveyor 27 (associated with rotary screen 25), line 71 carrying the unembrittled material from pick-up conveyor 70 associated with grinder 56, and line 87 carrying any final fuel product (taken from product line 64) which may be required to furnish the required heating values.

In a preferred apparatus embodiment, as shown in FIG. 1, a nonferrous separating means 72, e.g., an electromagnetic separator, is placed in line 71 to remove nonferrous metals, principally aluminum, from the unembrittled material prior to its burning in the burner/sterilizer means 80.

In this burner/sterilizer means 80, steam-laden hot air from dryer 30 is delivered to air inlet line 82 through fluid conduit 50, along with air taken into line 88, by fan 89. An auxiliary burner 90, having air inlet 91 and fuel inlet 92, is provided to furnish hot combustion gases via line 83 to rotary kiln 80 only until the system is fully operational or throughout any portion of the operation during which added heat is required. It will, of course, be appreciated that those components designated "lines", such as lies 85, 86, 87 and the like comprise any suitable, known means for moving the materials involved; and they may be conveyor belts, en-masse conveyors, closed conduits in which the combustibles are air-borne, and the like.

The hot gaseous products from burner/sterilizer 80 are put through a separator 95 to remove the fine particulate material entrained in them and they are then conveyed by conduit 96 to ball heater 46 wherein the steel balls are exposed to these hot gases. Subsequently, these gases at about 450° F are taken by way of blower 97 to a bag filter 98 for clean up prior to being discharged into the atmosphere. Since the hot gases from burner/sterilizer 80 have been sterilized and since they acquire no pollutants in their contact with the steel balls, the discharge from filter 98 presents no pollution problems.

Figure 16:
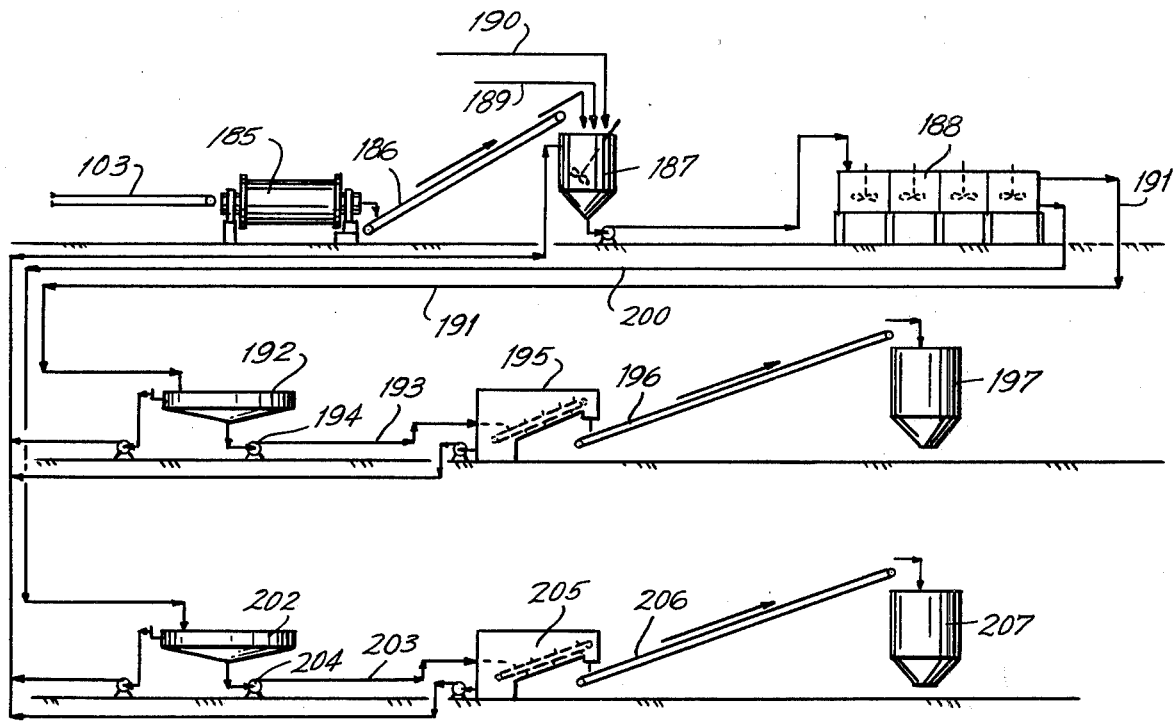
FIG. 16 illustrates optional glass recovery means.

The hot solids material discharged from burner/sterilizer 80, along with the solids separated out in separator 95, are directed into a cooler 100 in which heat transfer is effected between these solids and atmospheric air injected into cooler 100 by fan 101. The resulting hot air discharged from cooler 100 is added through means of conduit 102 to the steam-laden air from dryer 30. Finally, the cooled solids material discharged from cooler 100 is deposited upon conveyor means 103 which carries it to an inorganic recovery system (as shown in FIG. 16) or to a disposal point.

Figure 2:
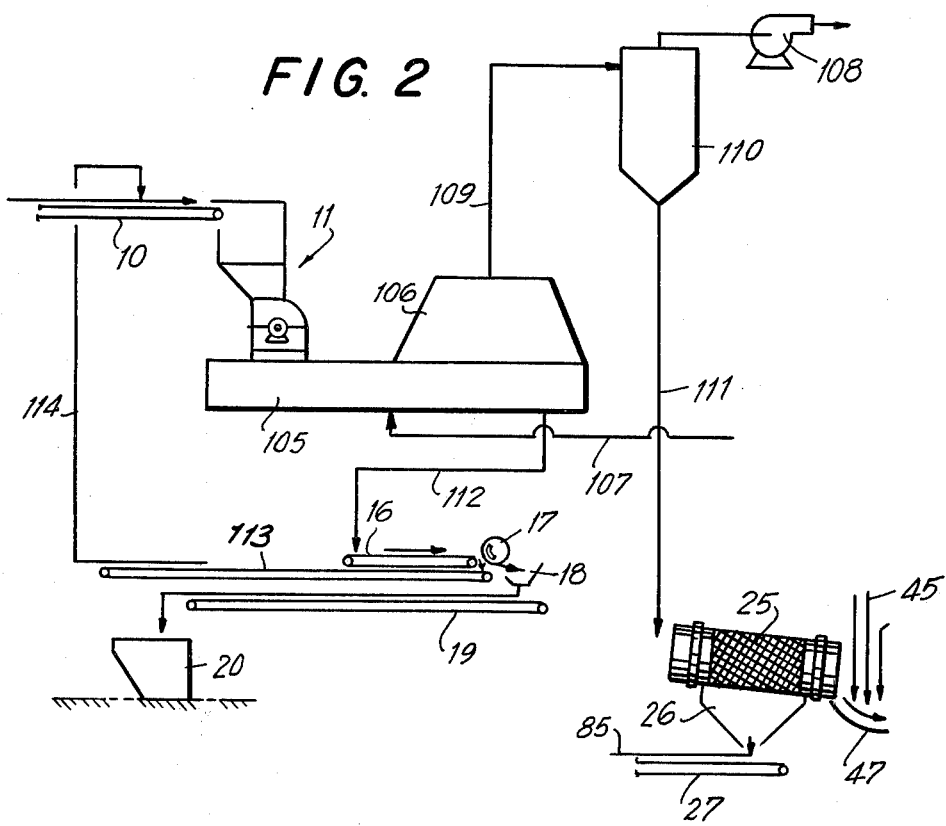
FIG. 2 illustrates the use of an air-classifier as the primary separating means.

FIG. 2, in which like reference numerals are used to identify like components illustrates another embodiment of primary separating means for separating the shredded solid waste. The primary separator of FIG. 2 is an air classification means and comprises an enclosed pan collector 105 receiving shredded material from shredder 11 and a hood 106 into which air is drawn through inlet 107 by means of a blower 108. The lightweight, adequately shredded organic material is entrained in the air and carried by line 109 into collector 110 from where it is taken by line 111 into the fines screening means 25 for processing in the manner previously described.

The heavier material collected at the bottom in pan collector 105, comprising that solid waste feed which was not adequately shredded along with the ferrous fraction, is discharged by way of line 112 onto conveyor 16 where it undergoes magnetic separation enabling the nonmagnetic, inadequately shredded material to be collected as on belt 113 for return by line 114 to the shredder 11.

FIG. 3 illustrates the use of magnetic separating means adapted to effect the separation of any magnetic, unembrittled material discharged from the grinder. Such unembrittled material arriving on conveyor 70 is exposed to a magnetic separator 120 which transfers the ferrous fraction to collector bin 121 from where it may be taken to storage bin 122. The nonmagnetic material falls onto conveyor 123 for transfer to electromagnetic separator 72 which may be a linear induction motor. Magnetic separator 120 may be used in place of magnetic separator 17 of FIG. 1; but it is preferable to use both of these separators at the two different locations.

The acid used in embrittling the organic fraction is preferably applied to the shredded organic feed prior to any appreciable drying. Thus in FIG. 1, the acid applying means (nozzle 37) is shown to be associated with the inlet of the dryer 30. As shown in FIG. 3, the spray nozzle 126 fed by acid line 125, which derives acid from a source similar to that shown in FIG. 1, may be positioned near the discharge end of rotary screen 25. Acid supply means may be associated with both the screening means and drying means as illustrated in FIG. 4. If different acid treating liquids are used (e.g., HCl and $H_2SO_4$) then one may be applied before the other, in which case acid supply lines 44 and 125 are connected to separate acid supply means. However, the same acid treating liquid may be applied at both locations.

Finally, FIG. 3 illustrates the use of the modified ball mill 56 as both drying and grinding means, eliminating dryer 30 as a separator component. In such a case, the steel balls are brought directly from the ball heater via line 41 into dryer/grinder 56 and air inlet line 36 also leads directly into it. The steam-laden air is removed from both the screen section 57 and ball discharge section 48 via fluid conduit 128 which is connected to blower 89 (FIG. 1) to serve the same function as fluid line 50 in that embodiment. It is, of course, also within the scope of this invention to associate the acid applying means with the inlet end of the dryer/grinder when a separate drying component is not used. However, it is preferable in such a case to apply most, if not all, of the acid to the shredded organic feed as it leaves the fines separating means as shown in FIG. 2.

All or a portion of the drying of the shredded organic feed may, if desired, be accomplished directly through the use of the hot gases from the burner/sterilizer, in which cases the steel balls may be eliminated from any drying means or may be used at a lower temperature than when they are required to provide all of the heat for drying. Exemplary means by which drying with hot gases may be accomplished are illustrated in FIGS. 5–7.

In the apparatus of FIG. 5, as in that of FIG. 2, the primary separating means comprises an air classifier and advantage is taken of this type of separator to heat the air used in air classification to achieve some or all of the drying. Thus heating means 130 is associated with air intake line 107 for this purpose. This heating means may provide for direct or indirect heating of the shredded feed and the heat may, of course, be supplied in the form of hot combustion gases generated by burning fossil fuel. It is, however, preferable to use all or a portion of the hot gases generated in burner/sterilizer 80 (FIG. 1).

Under some circumstances it may be desirable to accomplish a portion of the drying of the material during shredding, using the apparatus modification illustrated in FIG. 5. A branch air line 131 may therefore be connected through valve 132 and may be used to direct a predetermined amount of the hot air into the shredding means while introducing sufficient air through line 107 into the air classifier to entrain the shredded feed material to be delivered to the fines separating means. Alternatively, essentially all of the drying may be accomplished during shredding by introducing hot inert gases from separator 95 (FIG. 1) into the separating means. In those cases where there may be the possibility of some combustion of the solid waste occurring during shredding, the presence of such inert gases in the shredder may be desirable.

Drying and heating of the shredded organic fuel may be essentially completed in this manner, in which case the acid treating liquid may be applied in the rotary screen 25 and the heated steel balls for grinding may be introduced directly into grinder 56. If drying and heating is not completed in the drying/heating means associated with the air classifier shown in FIG. 5, then grinder 56 may also be used as an additional dryer/heater and the temperature of the steel balls is then adjusted to take into account the extent to which heat for drying is otherwise provided.

The hot gases from burner/sterilizer 80 may also be used in the rotary dryer 30 in place of heated steel balls and this modification of the apparatus is illustrated in FIG. 6. A portion of these hot gases is drawn off from line 96 and introduced, by means of blower 135 in line 136, into dryer 30. Under these circumstances, it is not necessary to introduce additional ambient air into the dryer. If drying is not completed in rotary dryer 30, then the steel balls used in grinder 56 are heated, as in the case of the use of the apparatus of FIG. 5, to the extent they are required to provide heat to complete the drying.

Figure 14:
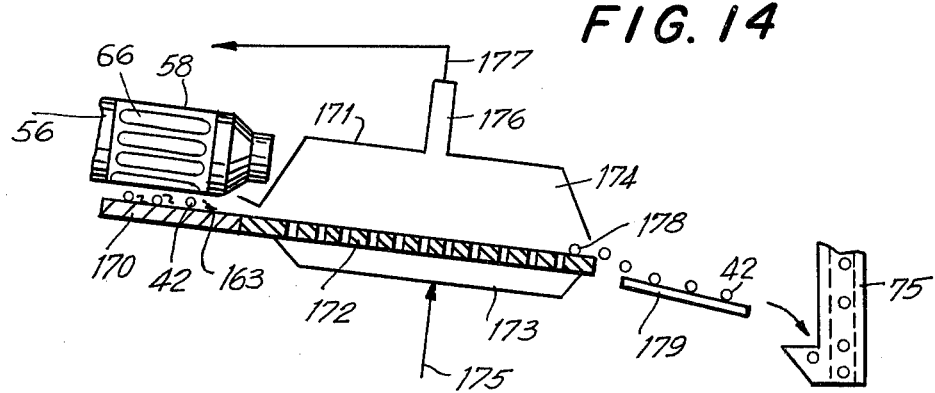
Figure 15:
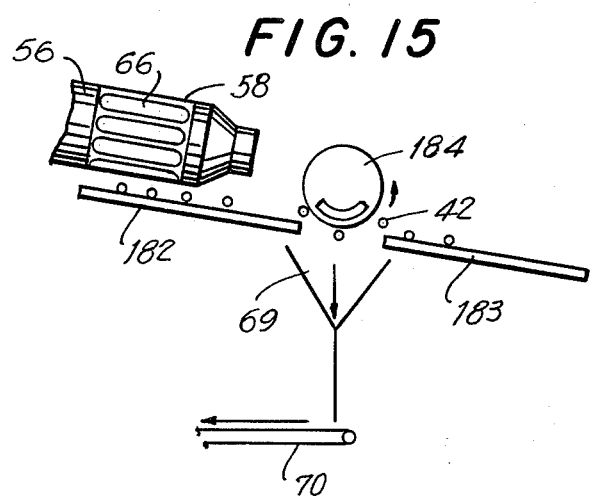

It is also within the scope of this invention to supply all of the heat used in forming the organic fuel product in a form other than that involving the heating of the grinding media. Thus, for example, the apparatus of FIG. 7 illustrates an embodiment in which no portion of the sterile hot gases from separator 95 is used to heat the steel balls, heater 46 (FIG. 1) being eliminated; and all or a portion of these gases are used directly in drying and grinding. The hot gases from separator 95 are directed through line 137 into blower 135 for introduction into dryer 30. Grinder 56 is provided with suitable heating means associated with that portion of the grinder in which attrition grinding is accomplished. Such heating means may be a heating jacket 138 or any other suitable, well-known means for introducing heat into the grinder and a portion of the hot gases drawn off through line 140 may be circulated through jacket 138. In this case, the grinding media, e.g., steel balls, are recirculated back in the grinder over a route shown schematically as line 139 after being separated from unembrittled material by any suitable means such as shown in FIGS. 1, 14 and 15.

FIG. 7 also illustrates another means for separating out the final organic fuel product from the coarse embrittled material which is returned to the grinder for further grinding. This means 145 is an air-classifier and comprises cylindrical means to define an air column 146, a blower 147 for introducing air into column 146, a product draw-off line 148 and a coarse material draw-off line 149 which transfers the recycled coarse material to the grinder inlet. Normally with this type of separating means, it will not be necessary to provide separate product cooling means.

As illustrated in FIG. 8, in those cases where none or only a minor portion of the heating is performed in the grinder, the grinder may be a rod mill 150, thus eliminating the need for handling any grinding balls. The rod mill grinder 150 may not be heated at all, or some heat may be introduced either as hot gases or in the manner shown in FIG. 7. The discharge from rod mill 150, constituting embrittled product material and unembrittled material, is directed onto a multideck screen 151 which takes the unembrittled material off first and then separates the coarsely ground material for return to grinder 150 from the finely divided product material.

Figure 9:
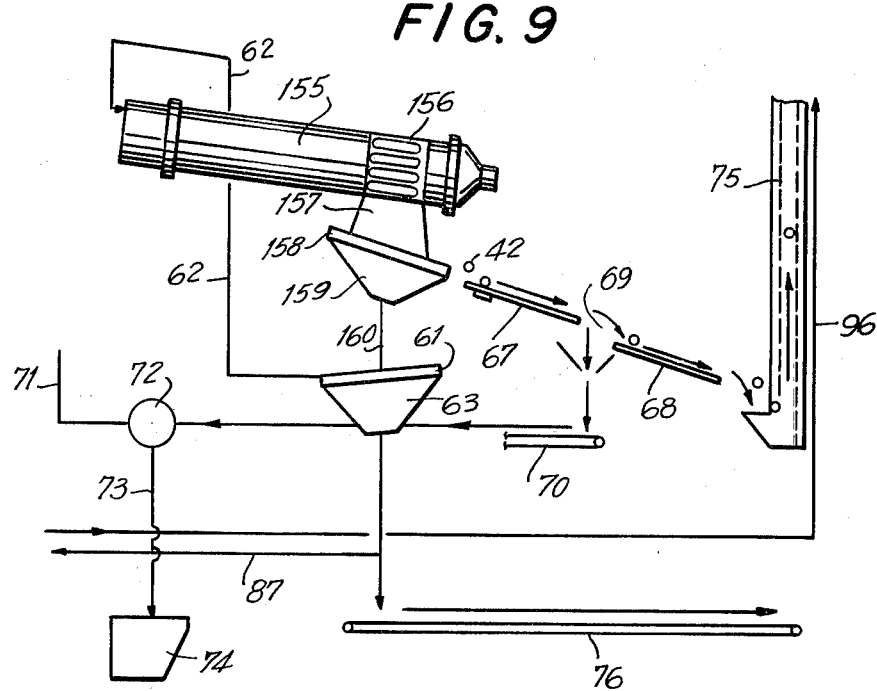
FIGS. 9–15 illustrate further modifications in the grinder discharge separating means.

FIGS. 9–15 illustrate further modifications in the grinding means and in the means for separating the materials discharged from the grinder. In the modification of FIG. 9, grinder 155 is of the modified ball mill type having a single discharge section 156 through which finely and coarsely ground embrittled fuel product, unembrittled fuel product, unembrittled material and the steel balls are all discharged through chute 157 onto a first screen 158 which separates the balls and unembrittled material from embrittled product. The unembrittled fraction is then processed for further separation by such apparatus shown in FIG. 1 or by that illustrated in FIGS. 14 and 15 and described below. The fine and coarse fuel products are collected in collector 159 and taken through line 160 to a second separator 61 for further separation as previously described. These separators may, of course, be combined into a multideck screen, for example.

Figure 10:
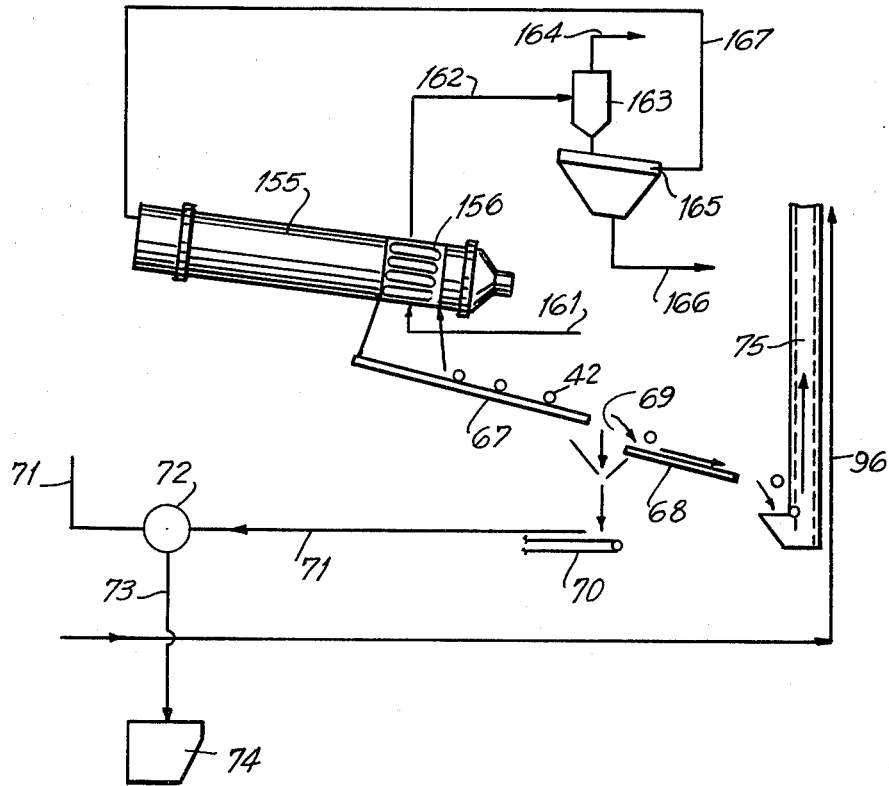

FIG. 10 illustrates a modification in the grinder discharge separating means used with the grinder modification of FIG. 9 in which there is provided but a single discharge section 156. In the modified apparatus of FIG. 10, the embrittled product is entrained in an air stream which is introduced through line 161 and which is discharged through line 162 into a separator 163. Separator 163 filters out any particulate material so that clean air may be discharged through line 164 and the embrittled organic material transferred to screen 165 from where the fuel product is separated and discharged through line 166 and the inadequately ground embrittled material is returned by line 167 to inlet of grinder 155. Under those circumstances where the entraining air can be at ambient temperature (e.g., where the drying means are separate from the grinding means) this means for separating the embrittled material from the grinding media and unembrittled material also provides product cooling means.

Figure 11:
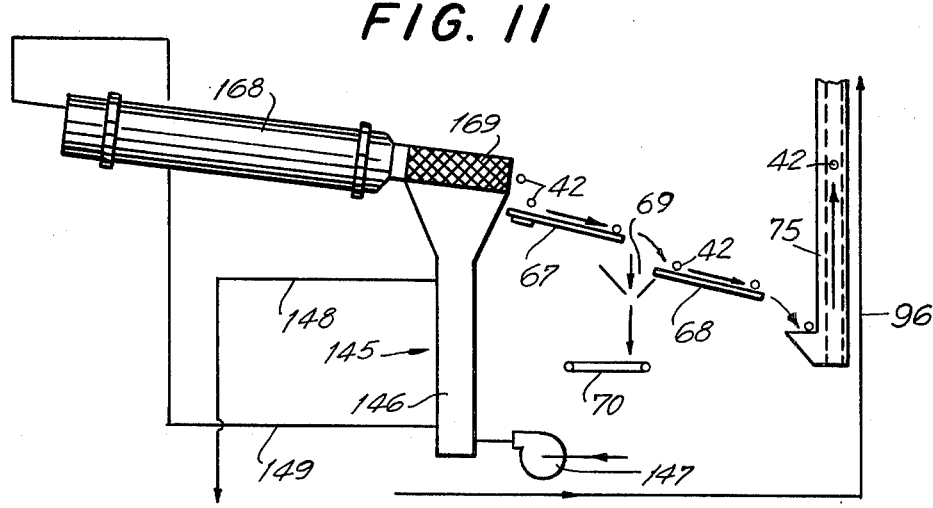
Figure 12:
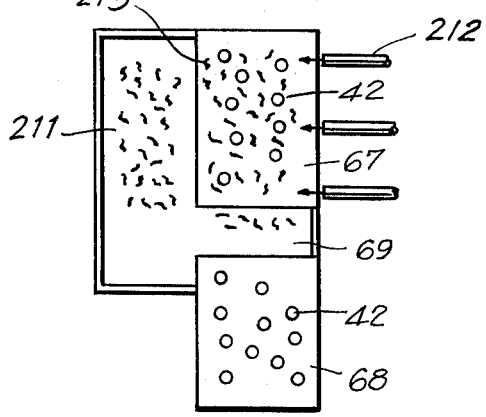

In the embodiment shown in FIG. 11, the grinder 168 is also a modified ball mill which terminates in a rotating screen 169. Through screen 169 pass the finely and coarsely ground fuel products for separation by suitable means such as the screen means of FIG. 1 or the air-classifier means of FIG. 7, the latter being illustrated in FIG. 11. The combined unembrittled material and steel balls are discharged at the end of screen 169 for further separation by any suitable means.

Under some circumstances, the unembrittled material discharged onto the first receptor tray 67 along with the grinding balls may decrease the momentum of the rolling balls to the point where some of them are not able to jump gap 69 onto receptor tray 68. This situation may be remedied by the modification shown in FIGS. 12 and 13 which are top plan and longitudinal cross sectional views of receptor trays 67 and 68. A bin 211 is provided under tray 67 and it extends beyond one side thereof. Bin 211 also extends under gap 69. Jets of air, delivered through lines 212, are directed across tray 67 transverse to the direction of rolling movement of the balls 42, thus forcing at least a portion of the unembrittled material 213 into bin 211 and preventing it from impeding the travel of steel balls 42. Alternatively, suction of the unembrittled material from tray 67 may be employed, or tray 67 may be vibrated by any well-known means.

In the embodiment shown in FIG. 14, the steel balls and unembrittled material coming from discharge section 58 of grinder 56 fall onto a surface 170 and are taken into a form of air-classifier 171 comprised of a foraminous floor member 172, under which is a plenum chamber 173 and above which is an enclosed hood 174. Air under pressure is introduced through line 175 into plenum chamber 173 and the unembrittled material is entrained in the air and carried into discharge column 176 and from there through conveyance means (represented as line 177) to the burner/sterilizer 80 (FIG. 1). The heavier balls 42 pass through opening 178 in hood 174 and fall onto conveyor 179 for recycling to the grinder after heating, if desired.

Finally, FIG. 15 shows magnetic means for separating the steel balls 42 from unembrittled material. As these two materials fall through slots 66 of grinder discharge section 58 they strike a first inclined surface 182 which brings them within the effective range of magnetic separator 184 designed to hold balls 42 and subsequently fling them onto a second inclined surface 183 for recycling. The nonmagnetic unembrittled material falls into chute 69 and is processed as previously described.

The apparatus illustrated in FIGS. 1-15 and described above represent preferred embodiments and modifications in so far as they make it possible to recover a large portion of the fuel values of the waste material being disposed of and in so far as they eliminate the need to deal with any excess acid in the gas streams discharged by the drying and grinding means. It is, however, within the scope of this invention to provide apparatus which incorporates means to provide all or a portion of the heat energy required for drying and/or grinding through combustion of fossil fuel; and, if required, to provide apparatus for removing and recovering residual acid (e.g, HCl) from the gases upstream from the point of acid introduction. The first of such apparatus (for heating with fossil fuel) may comprise any suitable means to combust fossil fuel and means to transfer heat from the combustion products to the grinding medium, to the shredded material directly, to an external heating means associated with the grinder or to a combination of two or more of these. The second of such apparatus (for removal and recovery of residual acid—normally gaseous HCl) may comprise means to remove solid particulate matter therefrom, means to absorb the gas and means to recover or react the absorbed gas. For example, the cleaning of HCl-containing gas streams by bubbling them through an aqueous lime (CaO) solution is well-known and effective.

It will be apparent to those skilled in the art from the exemplary embodiments and modifications presented that a number of different arrangements of the basic apparatus components are possible and fall within the scope of this invention. These basic apparatus components comprise shredding means, primary separating means, magnetic separating means, fines screening means, acid applying means, drying means, grinding means, heating means, and grinder product separating means. As will be apparent from FIGS. 1-15, some order of apparatus components are dictated by that part of the process in which the organic fraction of the waste being disposed is converted to a useful fuel or fuel supplement. Thus it will generally be necessary to arrange the components so that the shredding means comes first, that the fines screening means precedes the acid applying means which in turn precedes or is part of the drying means and that the drying means precedes or is part of the griding means.

The waste disposal system of this invention may include such optional apparatus components as glass recovery means and nonferrous metal recovery means integrated with a total system such as that shown in FIG. 1.

Figure 13:
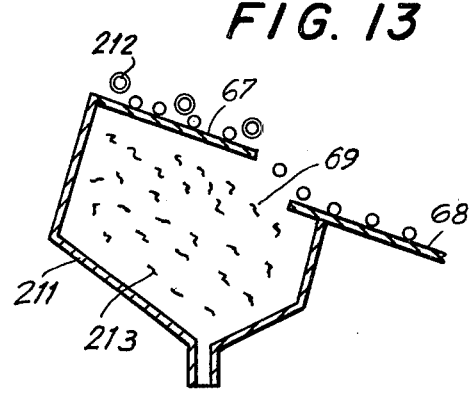

FIG. 16 illustrates somewhat schematically one type of glass recovery means which may be used. Turning first to FIG. 1, it will be seen that the pulverized glass resulting from shredding is contained in the fines discharged by the fines screening means (e.g., rotary screen 25) and taken to burner/sterilizer 80. As pointed out above, the maximum temperature attained within burner/sterilizer 80 may be below that at which any appreciable fusing of the inorganics, including glass, takes place. This, in turn, means that the solids residue discharged from cooler 100 onto conveyor 103 waste in pulverized form. It is this inert and sterilized solids residue with pulverized glass that is then conveyed to a glass recovery means such as illustrated in FIG. 13.

The glass recovery means of FIG. 16 comprises means 185 for further grinding the residue (e.g., a rod mill), a conveyor 186 extending between grinder 185 and a slurry tank 187, and a series of flotation cells 188. Suitable lines 189 and 190 are provided to introduce a flotation reagent and water into the slurry tank. A suitable conduit means 191 connects the upper section of flotation cells 188 with a glass settler 192 which in turn is connected by conduit 193, having an associated pump 194, to a dewatering rake 195 feeding product glass to a dryer/conveyor 196 which takes the recovered glass to storage 197.

The tailings from flotation cells 188 are processed in similar manner in similar apparatus comprising conveying line 200, a tailing settler 202, conduit 203 with pump 204, dewatering rake 205, dryer/conveyor 206 and clean fill storage bin 207. The clean fill carried to storage bin 207 represents essentially all of the solid residue which remains to require some form of disposal.

The apparatus of this invention provides novel means for disposing of solid wastes, particularly of solid municipal wastes. The disposal is carried out in a manner to convert the organic fraction of the waste to a fuel or fuel supplement, to recover the inorganic fraction in the form of one or more valuable products and to produce a minimum amount of sterile land fill. Moreover, the apparatus of this invention makes it possible to handle solid municipal wastes with the achievement of a high net energy efficiency and without the creation of any pollution problems.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:
1. An apparatus for the processing and disposal of solid wastes and the converting of the organic fraction thereof into a fuel product comprising, in combination
   a. shredding means to reduce the particle size of solid waste containing organic and inorganic fractions to form a shredded feed material;
   b. magnetic separating means for removing magnetic material from said shredded feed material;
   c. fines separating means to remove the fines including glass, dirt, and sand from said shredded feed material;
   d. acid applying means for distributing an acid reagent onto said shredded feed material;
   e. shredded feed material drying/heating means;
   f. grinding means to reduce the organic fraction of said shredded feed material, embrittled by acid and heat, to a finely divided fuel product; and g. grinder discharge separating means for separating upon discharge from said grinding means the unembrittled fraction of said shredded feed material from the embrittled organic fraction containing said fuel product.

2. An apparatus in accordance with claim 1 which also comprises primary separating means for separating out insufficiently shredded material from said shredded feed material and means to return said insufficiently shredded material to said shredding means.

3. An apparatus in accordance with claim 1 wherein said magnetic separating means is positioned to effect the removal of said magnetic material before said shredded feed material is subjected to said fines separating means.

4. An apparatus in accordance with claim 3 including auxiliary magnetic separating means positioned to effect removal of magnetic material from said unembrittled fraction separated by said grinder discharge separating means.

5. An apparatus in accordance with claim 1 including nonferrous separating means for removing nonferrous metals from said unembrittled fraction separated by said grinder discharge separating means.

6. An apparatus in accordance with claim 1 wherein said acid applying means is located proximate the discharge end of said fines separating means.

7. An apparatus in accordance with claim 1 wherein said acid applying means is located proximate the inlet end of said drying/heating means.

8. An apparatus in accordance with claim 1 wherein said acid applying means are located proximate the discharge end of said fines separating means and proximate the inlet end of said drying/heating means.

9. An apparatus in accordance with claim 1 including fuel product cooling means.

10. An apparatus in accordance with claim 1 including burner/sterilizer means for burning said fines from said fines separating means and said unembrittled fraction from said grinder discharge separating means, said burner/sterilizer means providing hot sterile gases for said shredded feed material drying/heating means.

11. An apparatus in accordance with claim 10 including means to introduce steam generated in said drying/heating means into said burner/sterilizer means.

12. An apparatus in accordance with claim 10 including means to introduce a predetermined amount of said finely divided fuel product into said burner/sterilizer means.

13. An apparatus in accordance with claim 10 including primary separating means for separating out insufficiently shredded material from said shredded feed material and means to return said insufficiently shredded material to said shredding means and wherein said drying/heating means comprises at least in part means to effect heat transfer between at least a portion of said sterile gases and said shredded feed material in said primary separating means.

14. An apparatus in accordance with claim 13 wherein said means to effect said heat transfer comprises means to heat a heat transfer fluid and means to contact said heat transfer fluid with said shredded feed material.

15. An apparatus in accordance with claim 13 wherein said means to effect said heat transfer comprises means to introduce said sterile gases into said primary separating means for direct contact with said shredded feed material.

16. An apparatus in accordance with claim 10 wherein said drying/heating means comprises at least in part means to introduce at least a portion of said sterile gases into said shredding means for direct contact with said solid waste.

17. An apparatus in accordance with claim 10 wherein said drying/heating means comprises kiln means and means to effect heat transfer between said sterile gases and said shredded feed material in said kiln means.

18. An apparatus in accordance with claim 17 wherein said means to effect heat transfer comprises means to introduce said sterile gases into said kiln means for direct contact with said shredded feed material.

19. An apparatus in accordance with claim 17 wherein said means to effect heat transfer comprises means to heat said shredded feed material through a heat transfer medium.

20. An apparatus in accordance with claim 19 wherein said heat transfer medium comprises the wall of said kiln means.

21. An apparatus in accordance with claim 19 wherein said heat transfer medium comprises grinding media circulated through said kiln means.

22. An apparatus in accordance with claim 1 including burner/sterilizer means for burning said fines from said fines separating means and said unembrittled fraction from said grinder discharge separating means, said burner/sterilizer means providing hot sterile gases for said grinding means.

23. An apparatus in accordance with claim 22 including means to effect heat transfer between said sterile gases and said material in said grinding means.

24. An apparatus in accordance with claim 23 wherein said means to effect heat transfer comprises means to introduce said sterile gases into said grinding means for direct contact with said material.

25. An apparatus in accordance with claim 23 wherein said means to effect heat transfer comprises means to heat said material through a heat transfer medium.

26. An apparatus in accordance with claim 25 wherein said heat transfer medium comprises the wall of said grinding means.

27. An apparatus in accordance with claim 25 wherein said heat transfer medium comprises grinding media circulated through said grinding means.

28. An apparatus in accordance with claim 1 wherein said drying/heating means and said grinding means include grinding media, means to heat said grinding media and means to circulate said grinding media in contact with said shredded feed material in said drying/heating means and then in said grinding means.

29. An apparatus in accordance with claim 28 wherein said drying/heating means and said grinding means are separate components.

30. An apparatus in accordance with claim 28 wherein said drying/heating means and said grinding means are combined.

31. An apparatus in accordance with claim 28 wherein said grinding media are balls.

32. An apparatus in accordance with claim 28 wherein said grinder discharge separating means also includes means to separate said grinding media from said unembrittled fraction.

33. An apparatus in accordance with claim 32 wherein said grinder discharge separating means comprises means to separate said finely divided fuel product from insufficiently ground embrittled organic material; means to return said insufficiently ground material to said grinding means; and wherein said means to separate said grinding media from said unembrittled fraction comprises a first inclined receptor tray for receiving said grinding media and said unembrittled fraction from said grinding means and at least one additional inclined receptor tray following said first tray and defining a spacing therewith, said spacing being so dimensioned that said grinding media may cross from said first to said second tray while said unembrittled fraction falls therethrough.

34. An apparatus in accordance with claim 33 including means associated with said first receptor tray for imparting to said unembrittled fraction motion substantially transverse to the direction of travel of said grinding media thereby to minimize any decrease in momentum of said grinding media.

35. An apparatus in accordance with claim 33 wherein said grinding media are steel balls and said means to separate said grinding media from said unembrittled fraction includes magnetic means associated with said spacing for transferring said steel balls from said first tray to said at least one additional tray.

36. An apparatus in accordance with claim 32 wherein said means to separate said grinding media from said unembrittled fraction comprises foraminous plate means and means to direct gas upwardly through said foraminous plate means to entrain said unembrittled fraction.

37. An apparatus in accordance with claim 1 wherein said grinding means has a first discharge means through which said embrittled organic fraction is discharged and a second discharge means through which said unembrittled fraction is discharged.

38. An apparatus in accordance with claim 37 wherein said grinding means includes grinding media and said grinding media is discharged through said second discharge means and wherein said grinding discharge separating means includes means to separate said unembrittled fraction from said grinding media.

39. An apparatus in accordance with claim 1 wherein said grinding means has a single discharge means.

40. An apparatus in accordance with claim 39 including means to direct air through said discharge means thereby to entrain said embrittled fraction.

41. An apparatus in accordance with claim 1 wherein said grinding means is a rod mill.

42. An apparatus in accordance with claim 1 wherein said grinder discharge separating means comprises means to separate said finely divided fuel product from insufficiently ground embrittled organic material; and means to return said insufficiently ground material to said grinding means.

43. An apparatus in accordance with claim 42 wherein said means to separate said finely divided fuel product from said insufficiently ground embrittled organic material comprises screen means.

44. An apparatus in accordance with claim 42 wherein said means to separate said finely divided fuel product from said insufficiently ground embrittled organic material comprises air classification means.

45. An apparatus in accordance with claim 1 including means to recover glass from said fines.

46. An apparatus for the processing and disposal of solid wastes and the converting of the organic fraction thereof into a fuel product comprising, in combination
   a. shredding means to reduce the particle size of solid waste containing organic and inorganic fractions to form a shredded feed material;
   b. primary separating means for separating out insufficiently shredded material from said shredded feed material and means to return said insufficiently shredded material to said shredding means;
   c. magnetic separating means for removing magnetic material from said shredded feed material;
   d. fines separating means to remove the film including glass, dirt, and sand from said shredded feed material,
   e. acid applying means for distributing an acid reagent onto said shredded feed material;
   f. grinding media;
   g. a shredded feed material drying/heating means;
   h. grinding means to reduce the organic fraction of said shredded feed material, embrittled by acid and heat, to a finely divided fuel product;
   i. grinder discharge separating means for separating upon discharge from said grinding means said grinding media and the unembrittled fraction of said shredded feed material from the embrittled organic fraction containing said fuel product;
   j. means for separating said grinding media from said unembrittled fraction;
   k. means for separating said finely divided fuel product from insufficiently ground embrittled material and means to return said insufficiently ground embrittled material to said grinding means;
   l. burner/sterilizer means for burning said fines from said fines separating means and said unembrittled fraction from said grinder discharge separating means thereby to provide hot sterile gases and a sterile solid residue;
   m. heat transfer means to use said hot sterile gases to heat said grinding media; and
   n. means to circulate said grinding media after heating in contact with said shredded feed material in said drying/heating means and then in said grinding means.

47. An apparatus in accordance with claim 46 including means to cool said finely divided fuel product.

48. An apparatus in accordance with claim 46 including nonferrous separating means for removing nonferrous metals from said unembrittled inorganic fraction separated by said grinder discharge separating means.

49. An apparatus in accordance with claim 46 including means to recover glass from said sterile solid residue.

50. An apparatus in accordance with claim 46 including means to introduce steam generated in said drying/heating means into said burner/sterilizer means.

51. An apparatus in accordance with claim 46 including means to introduce a predetermined portion of said finely divided fuel product into said burner/sterilizer means.

* * * * *